United States Patent [19]

Jezek

[11] 3,772,863
[45] Nov. 20, 1973

[54] PLANT STRIPPING APPARATUS
[76] Inventor: Henry J. Jezek, 1204 E. Downes Ave., Temple, Tex.
[22] Filed: Feb. 28, 1972
[21] Appl. No.: 229,724

Related U.S. Application Data
[63] Continuation-in-part of Ser. No. 60,417, Aug. 3, 1970, abandoned.

[52] U.S. Cl. ................................. 56/34, 56/127
[51] Int. Cl. ........................................ A01d 45/18
[58] Field of Search ............ 56/33, 34, 35, 126–130, 56/330

[56] References Cited
UNITED STATES PATENTS
3,402,537 9/1968 Jezek, Jr. ................................ 56/34
541,307 6/1895 Bassett et al. ......................... 56/330
717,925 1/1903 Richards ............................... 56/128

FOREIGN PATENTS OR APPLICATIONS
345,135 7/1904 France .................................. 56/128

Primary Examiner—Russell R. Kinsey
Attorney—W. F. Hyer et al.

[57] ABSTRACT

A plurality of stripping fingers for stripping cotton bolls and the like are mounted on a vehicle for movement through cotton plants to strip the bolls therefrom. Located at the rear of the fingers is a conveyor that carries the bolls to a storage bin or the like. To keep the diameter of the opening to the conveyor to a minimum for a given stripping width, the fingers are mounted on the vehicle so that they fan outwardly in the direction of travel of the vehicle. This allows the fingers to strip a swath of the desired width while using a conveyor that is narrower than the width of the swath being stripped.

8 Claims, 7 Drawing Figures

Henry J. Jezek
INVENTOR

ATTORNEYS

Henry J. Jezek
INVENTOR

BY Hyer, Eickenroht,
Thompson + Turner
ATTORNEYS

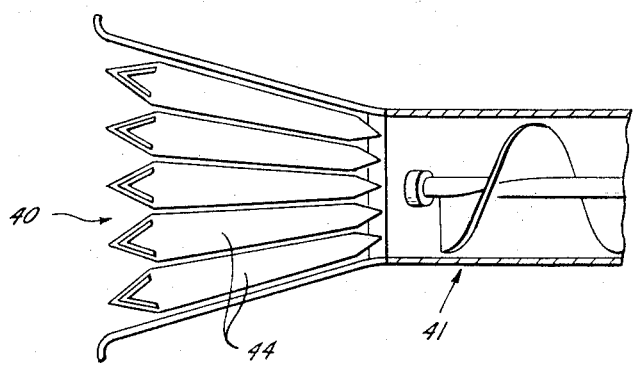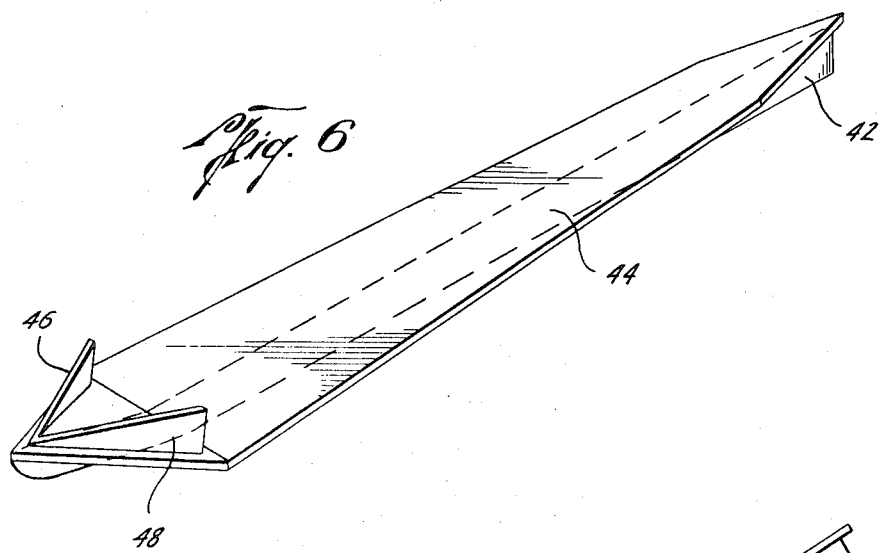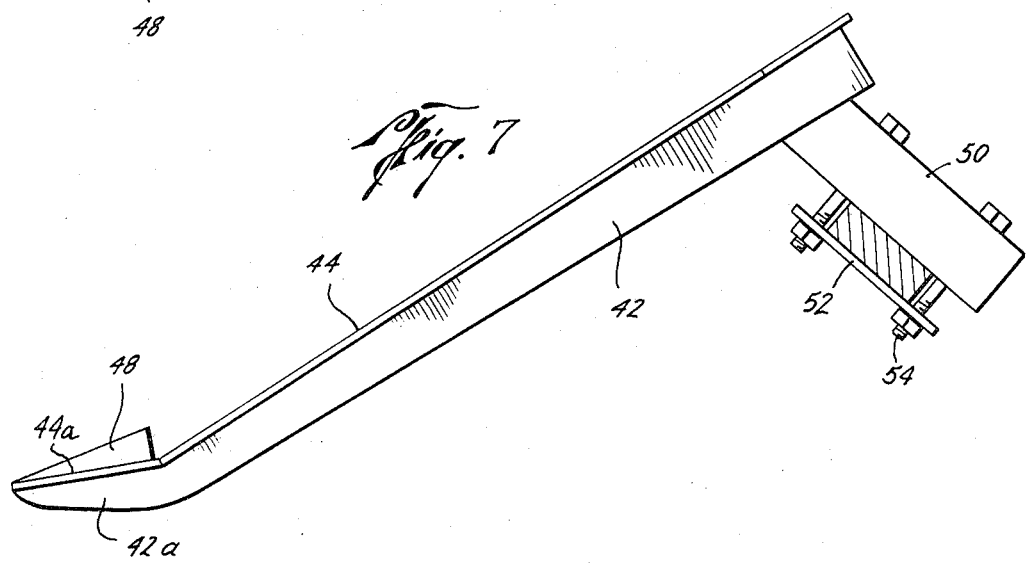

PLANT STRIPPING APPARATUS

This is a continuation in part of Patent application Ser. No. 60,417, now abandoned, filed Aug. 3, 1970, and entitled "PLANT STRIPPING APPARATUS."

This invention relates to apparatus for stripping agricultural products from plants in the field, such as the bolls from cotton plants, and that has a plurality of fingers that move through the plants to comb or strip the product from the plants.

Plant stripping apparatus of the type to which this invention relates has a plurality of elongated fingers mounted on a vehicle to extend in the direction of travel of the vehicle. The fingers are positioned in spaced, parallel, side-by-side relationship. The fingers are inclined downwardly in the direction of travel of the vehicle to allow the lower part of the plant to enter between the fingers first with the fingers moving progressively higher on the plant as the fingers move past the stalk. A rotating reel normally is located above the fingers to move the products stripped rearwardly to a conveyor system that carries the products rearwardly to a bin or the like either mounted on the vehicle itself or pulled along behind the vehicle. The conveyor system commonly used is the screw or auger type. Preferably, the conveyor is approximately the same width as the group of fingers. As the width of the swath the fingers make through the plants increases, the width of the main or rearward moving conveyor either increases proportionally or a cross conveyor is used to move the products stripped laterally to the rearward conveyor.

It is an object of this invention to provide plant stripping apparatus wherein the width of the rearwardly moving conveyor is a minimum for a given stripping width.

It is another object of this invention to provide plant stripping apparatus having a rearward conveyor that is narrower than the swath the apparatus strips and that does not need cross augers to move the stripped products to the conveyor.

It is another object of this invention to provide cotton stripping apparatus having a plurality of fingers to comb the cotton bolls from the cotton stalks wherein the width of the swath of the fingers through the cotton stalks can be increased without having to increase the width of the conveyor means that moves the bolls rearwardly to the storage bin or the like.

It is another object of this invention to provide an assembly of cotton stripping fingers that permit the conveyor located at the rear of the assembly to receive the bolls stripped by the fingers to be narrower than the width of the swath that the fingers make through the cotton.

It is another object of this invention to provide an assembly of cotton stripping fingers that can strip a greater area of cotton for the same distance travelled than conventional fingers while employing the same number of fingers, the same size of rearwardly moving conveyor without cross conveyors, and without sacrificing its stripping efficiency.

It is a further object of this invention to provide an assembly of cotton stripping fingers for mounting on a vehicle that are inclined downwardly in the direction of travel of the fingers to comb the bolls from cotton stalks passing between the fingers and that have their forward end portions substantially parallel to the ground to engage the ground and keep the fingers from digging into the ground should the terrain over which the vehicle is moving cause the fingers to engage the ground.

These and other objects, advantages, and features of this invention will be apparent to those skilled in the art from a consideration of this specification including the attached drawings and appended claims.

In the drawings, wherein like reference characters are used throughout to designate like parts:

FIG. 5 is a top plan view of another embodiment of the assembly of cotton stripping fingers of this invention;

FIG. 6 is an enlarged isometric view of one of the fingers of the assembly of FIG. 5; and FIG. 7 is a side view of the finger of FIG. 6 as mounted on a vehicle.

The stripping apparatus of this invention can be mounted on a trailer and pulled behind a tractor or mounted directly on the tractor itself in the well-known manner. On either vehicle, the apparatus is mounted so that an assembly of cotton stripping fingers will be moved along a row of plants to comb the product, such as cotton bolls from the plants and convey the stripped product rearwardly and upwardly to a storage bin or the like.

Figure 1:
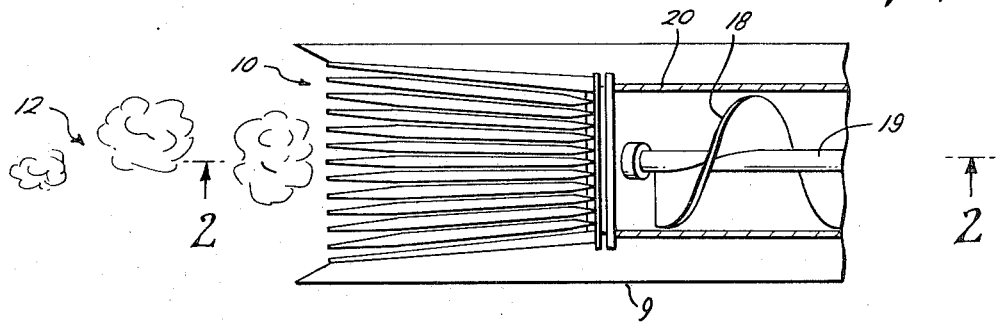
FIG. 1 is a top plan view partially in section of the forward portion of a cotton stripping apparatus constructed in accordance with the preferred embodiment of this invention and taken along line 1—1 of FIG. 2.
Figure 2:
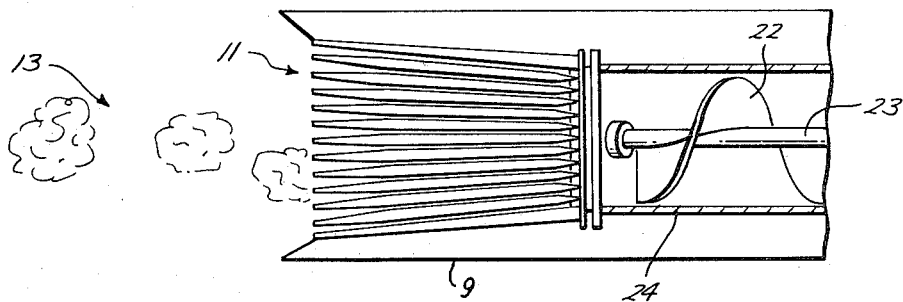
FIG. 2 is a view taken along line 2—2 of FIG. 1.
Figure 2:
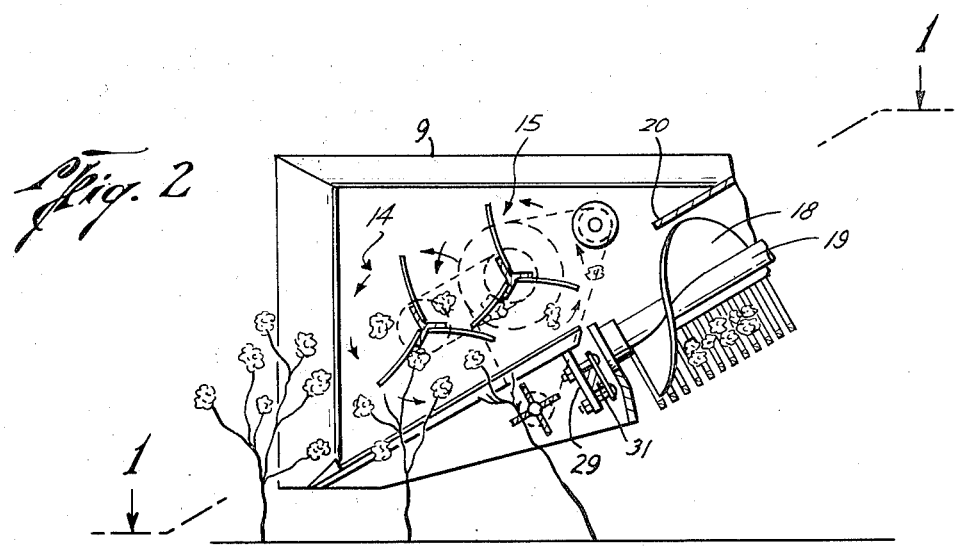

As shown in FIG. 1, stripper finger assemblies 10 and 11 are mounted upon frame 9 and serve to to strip two parallel, side-by-side rows of cotton, generally indicated by the numbers 12 and 13, respectively. Finger assemblies 10 and 11 comprise a plurality of individual fingers mounted on the vehicle in generally parallel, spaced relationship. Each finger extends forwardly in the general direction of travel of the vehicle and is inclined downwardly. As shown in FIG. 2, as the fingers move through the cotton stalks, the stalks will move between the fingers and the bolls thereon will be combed from the stalks and carried rearwardly by reels 14 and 15.

Positioned on the frame 9 at the rear of each assembly of fingers. is conveyor means for carrying the stripped product, cotton bolls in the embodiment shown, rearwardly and upwardly to a storage bin or the like (not shown). The expression "or the like" is used because the conveyor means may carry the bolls to various special apparatus, a trash remover, for example, that can be used to remove sticks and trash that are carried upwardly with the bolls before the bolls are moved to a bin.

Any type of conveyor can be used. One commonly used is a screw type or auger type, such as shown in the drawings. Whatever the type of conveyor, it is preferably wide enough at its lower end to receive bolls from between any of the fingers. Therefore, the opening at the lower end of the conveyor should be substantially as wide as the distance between the outermost fingers.

In the embodiment shown, screw or auger 18 is mounted on shaft 19 for rotation within tubular housing 20. The lower end of tubular housing 20 is positioned adjacent the rear end of finger assembly 10, and the diameter of the opening in the lower end of housing 20 is approximately equal to the distance between the outermost fingers of this assembly, measured at the rear of the finger assembly.

The same is true for auger 22, which is mounted on shaft 23 and positioned for rotation within housing 24. Here again, the opening of the lower end of tubular housing 24 is substantially equal to the width of the rearward end of finger assembly 11. The bottom sides of both housing 20 and 24 are slotted to allow sticks and other trash to fall through as the bolls are moved upwardly by the augers within the housings.

Figure 4:
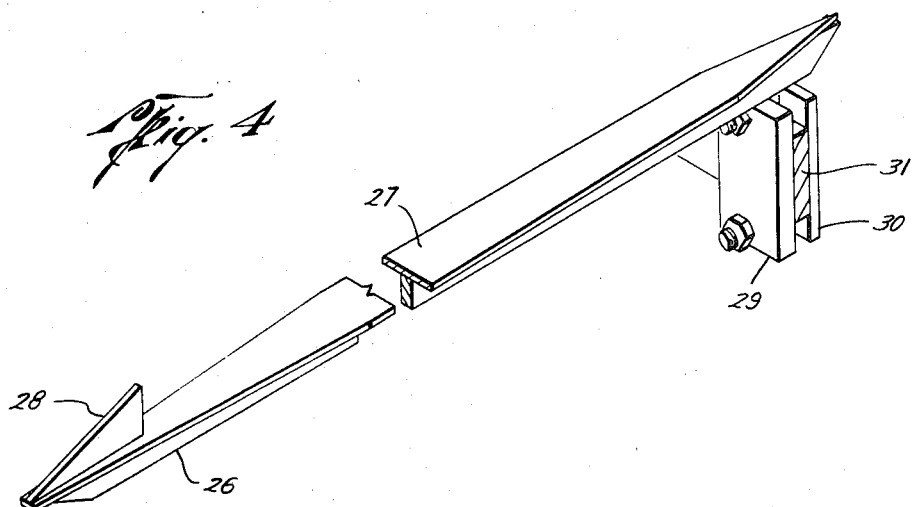
FIG. 4 is an isometric view of one of the fingers of the finger assemblies shown in the previous figures also on an enlarged scale to better show the construction and mounting arrangement of the fingers.

FIG. 4 shows one of the fingers of the finger assemblies employed in the apparatus. Each finger is identical, so only one will be described in detail. Each finger comprises elongated body 26 and stripping plate 27. Preferably, the stripping plate is attached to the forward end of mounting plate or body 26, usually by a short tack weld. Body 26 is preferably relatively narrow in the horizontal direction so it can bend in a horizontal direction and allow the rearward end of the plate to move laterally relative to body 26 as required for large cotton stalks to move between the stripping plates on adjacent fingers. Preferably, however, body 26 is relatively thick in the vertical direction to provide stiffness to the finger to resist bending in a vertical direction.

Lug 28 is mounted on the forward end of the stripping plate to help prevent bolls stripped from low on the cotton stalk from sliding off the forward end of the plate and onto the ground.

Each finger is mounted on the vehicle, in the embodiment shown, by mounting plate 29, which is attached to body 26. Another plate 30 is positioned on the opposite side of mounting bar 31, carried by frame 9 and the two plates are bolted together as shown in FIG. 4 to attach the finger to the vehicle.

Figure 3:
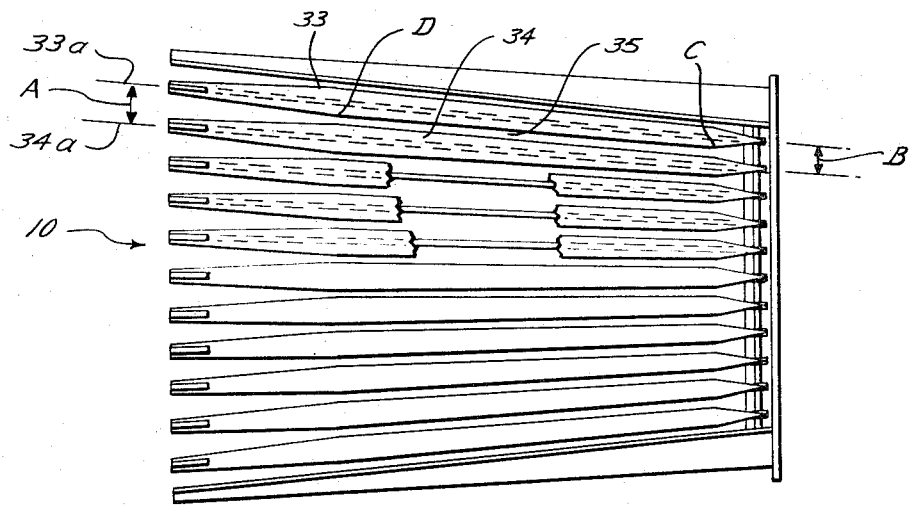
FIG. 3 is a plan view, on an enlarged scale, of one of the stripping finger assemblies of FIG. 1 with a portion of some of the fingers broken away to better show the construction thereof.

In accordance with this invention, the fingers of each of finger assemblies 10 and 11 are mounted on the vehicle so that the longitudinal axis of each finger extends forwardly at an angle to the longitudinal axis of the adjacent finger or fingers, as the case may be. Thus, as shown in FIG. 3, longitudinal axis 33a of finger 33 would intersect longitudinal axis 34a of finger 34, if the two axes were extended to the point of intersection. In other words, distance A between the longitudinal axes of the two fingers adjacent their forward ends is greater than distance B between the axes adjacent their rearward ends. This is true of all the fingers of assembly 10. This causes the fingers to fan outwardly in a forward direction, thereby increasing the swath stripped by the fingers considerably. Conversely, this increase in the width of the swath stripped is obtained without requiring a corresponding increase in the width of the opening in the conveyor means located at the rear of the finger assembly.

Preferably, the stripper plates of the fingers, such as stripper plate 27, are progressively wider toward the forward end. In other words, the sides of each plate diverges in a forward direction over a substantial portion of its length. By proper selection of the angle of divergence, the space between the fingers will be substantially equal throughout for the entire length of the diverging portion. Thus, referring again to FIG. 3, space 35 between fingers 33 and 34 is substantially equal between the points C and D of finger 33. From point D forward the sides of plates converge to provide a tapered opening to lead the plants being stripped into space 35 between the stripping plates of these two fingers. Rearwardly from point C, the sides of each plate converge again to allow the plants to escape from between the plates as the plates move past the plants.

The relationship of the stripping plates and the fingers is described in connection with only two fingers 33 and 34. This same relationship is carried forward between each of the fingers of the assembly to produce the fan-shaped finger assemblies 10 and 11 that are shown in the drawings, with each two fingers being spaced apart substantially equal distances over a large portion of their length. This assembly then can make a swath through a row of plants that is wider than the swath made by a finger assembly having the same number of fingers, but which are in parallel relationship, without any perceptible loss in efficiency and without requiring the use of a wider conveyor.

In the embodiment of FIGS. 5, 6, and 7, the number of fingers of assembly 40 are reduced while maintaining approximately the same width stripping swath as that of the assemblies of FIG. 1. This assembly also feeds conveyor 41 of approximately the same diameter as those associated with the FIG. 1 assemblies. This is done by increasing the width of the stripping plate of each finger and its taper.

FIGS. 6 and 7 show one of the fingers of assembly 40. It includes finger body 42 and stripping plate 44. The body, as explained above, is sufficiently flexible to allow the forward end of the finger to move laterally to some extent. The plate can also be arranged for such limited lateral movement by attaching it to the body adjacent its forward end.

As stated above, in this embodiment, stripping plate 44 is substantially wider than plate 27 of the finger in FIG. 4. This allows fewer fingers to be used for the same width swath. It also allows two lugs 46 and 48 to be arranged, as shown in FIG. 6, to form a rearwardly opening cavity to catch and hold the bolls until the reel or other bolls can pick them up and move them up the fingers to the conveyor.

There is another important feature of the fingers of this embodiment. Forward portion 42a of the finger body is bent upward until its lower edge is substantially parallel to the ground. The upper edge is still inclined but not to the extent of the rest of the body. Forward portion 44a of the stripping plate is also bent upwardly as shown in FIG. 7. Lugs 46 and 48 are attached to this portion.

With this shape, should the wheels of the vehicle upon which the fingers are mounted, fall into a hole or the like, causing the fingers to engage the ground, the lower edge of portion 42a will act as a skid and keep the fingers from digging into the ground which in the past has caused fingers to be damaged. As shown in FIG. 7, the fingers of this embodiment are mounted on mounting bar 31 by clamping the bar between mounting plates 50 and 53 with bolts 54. Mounting bar 31 is part of a vehicle for supporting the fingers and for moving the fingers through the plants being stripped.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. Apparatus for stripping cotton bolls from cotton stalks, comprising a plurality of elongated substantially straight stripping fingers, means for mounting the rearward ends of the fingers on a frame with the fingers in side-by-side, spaced relationship and extending generally in the intended direction of travel of the frame with each finger being inclined downwardly in the direction of travel and with the longitudinal axis of each finger extending at an angle to the longitudinal axis of the adjacent finger or fingers so that the fingers fan out in the direction of travel of the frame to strip a swath wider than the distance between the rearward ends of the outermost fingers, said fingers being mounted with equal space therebetween along a substantial portion of their length.

2. The apparatus of claim 1 in which each finger includes a body and a stripping plate mounted on the body and extending laterally on each side of the body, said stripping plate having sides that diverge toward the forward end of the finger for a portion of its length to maintain the space between the fingers substantially uniform throughout the length of the diverging portion of the stripping plate.

3. The apparatus of claim 2 in which the forward end portion of each finger is substantially parallel to the ground.

4. Apparatus for stripping cotton bolls from cotton stalks, comprising a frame, an assembly of stripping fingers carried by the frame to strip the product from plants as the fingers are moved through the plants by the frame, conveyor means carried by the frame for moving the product stripped from the plants rearwardly from the fingers, said conveyor means having an opening positioned to receive the product at the rearward end of the stripping finger assembly, said assembly comprising a plurality of substantially straight elongated fingers, means mounting the fingers in side-by-side spaced relationship to extend generally in the direction of travel of the frame with each finger inclined downwardly in the direction of travel with the longitudinal axis of each finger extending generally forward in the direction of travel of the frame and at an angle to the longitudinal axis of the adjacent finger or fingers so that the opening of the conveyor means positioned to receive the product from the fingers can be narrower than the swath the fingers make through the cotton, each of said fingers increasing in width in the direction of travel along a substantial portion of their length at the same rate as the adjacent fingers diverge to maintain the spacing between the fingers uniform along said substantial portion of their length.

5. The stripping apparatus of claim 4 in which each finger includes a body and a stripping plate mounted on the body and extending laterally on each side of the body, said stripping plate having sides that diverge toward the forward end of the finger for a portion of its length to maintain the space between the fingers substantially uniform throughout the length of the diverging portion of the stripping plate.

6. The apparatus of claim 5 in which the forward end portions of the body and stripping plate of each finger is substantially parallel to the ground.

7. Apparatus for stripping cotton bolls from cotton stalks, comprising a plurality of elongated substantially straight stripping fingers, means mounting the rearward ends of the fingers on a frame with the fingers in side-by-side, spaced relationship and extending generally in the direction of travel of the frame with each finger being inclined downwardly in the direction of travel with the longitudinal axis of each finger extending at an angle to the longitudinal axis of the adjacent finger or fingers so that the fingers fan out in the direction of travel of the frame to strip a swath wider than the distance between the rearward ends of the outermost fingers, said fingers being mounted with equal space therebetween along a substantial portion of their length, with the forward end portions of the fingers being substantially parallel to the ground.

8. The apparatus of claim 7 in which two boll retaining lugs are attached to the forward portions of each finger to form a retaining cavity to catch and hold bolls from falling off the forward ends of the fingers.

* * * * *